(No Model.)
G. H. SMITH, R. K. HARTLEY & I. S. McDOUGALL.
ADJUSTABLE SEAT SUPPORT FOR BICYCLES.
No. 484,681. Patented Oct. 18, 1892.
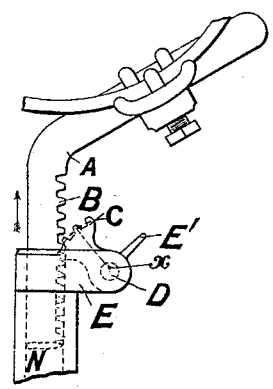
FIG. 1
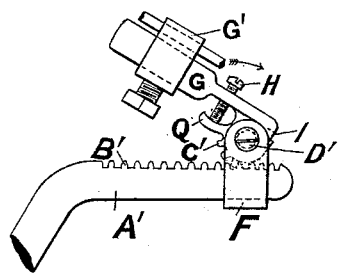
FIG. 2
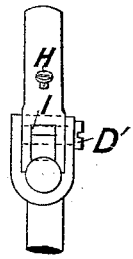
FIG. 2ª
Witnesses:
J. A. Rutherford
Robert Everett
Inventors:
George H. Smith,
Richard K. Hartley and
Isaac S. McDougall
By James L. Norris, Attorney

UNITED STATES PATENT OFFICE.

GEORGE HILTON SMITH, OF RHODES, RICHARD KENT HARTLEY, OF CHADDERTON, AND ISAAC SHIMWELL McDOUGALL, OF HIGH BROUGHTON, ENGLAND.

ADJUSTABLE SEAT-SUPPORT FOR BICYCLES.

SPECIFICATION forming part of Letters Patent No. 484,681, dated October 18, 1892.

Application filed October 29, 1891. Serial No. 410,233. (No model.) Patented in England March 21, 1891, No. 5,053.

*To all whom it may concern:*

Be it known that we, GEORGE HILTON SMITH, residing at Rhodes, RICHARD KENT HARTLEY, residing at Chadderton, and ISAAC SHIMWELL McDOUGALL, residing at High Broughton, in the county of Lancaster, England, citizens of Great Britain, have invented new and useful Improvements in Adjustable Seat Connections for Velocipedes, (for which we have obtained patent in Great Britain, No. 5,053, dated March 21, 1891,) of which the following is a specification.

Our invention relates to the adjusting and attaching arrangements of bicycle and other velocipede seats or saddles, and its object is to enable such seat to be instantaneously attached or detached from a bicycle or tricycle and instantaneously adjusted to any convenient height, at the same time to provide for the absolute security of the seat while in use, and entirely obviate the difficulty of slipping, which often arises with seat attachments of existing construction.

In carrying our invention into effect we may adopt a modified arrangement of our main construction; but in each instance we arrange that the pressure caused by the weight of the rider securely holds the seat-fastenings, but in such manner that when the weight is removed the seat may be immediately detached or its height altered, as required. According to one arrangement we provide the seat-pillar or other portion of the bicycle-frame to which the saddle or seat is attached with a socket in which there fits and slides a rack projection carrying the saddle or seat. At the upper part of the socket or tube we arrange a toothed segment-piece pivoting in a projection or attachment, and we cause this toothed segment-piece on its pitch-circle to be eccentric to the center from which it pivots. The eccentricity causes the teeth to lock firmly into the rack-teeth when the seat is thrust down, and so the weight of the rider is firmly sustained, while when weight is removed the rack may be at once withdrawn and the seat thereby detached or adjusted in height as desired.

Referring to the accompanying sheet of drawings, Figure 1 shows the invention constructed and applied as hereinbefore described. Figs. 2 and 2ᴬ are side and end elevations of a modification intended for application to some existing bicycles.

In Fig. 1 the tubular seat-pillar N carries a head piece or lugs E, from which pivots a toothed segment piece C at the pivot D. The pitch-circle of the teeth is struck from a center—such as $x$—removed from that of D, so that the rack B, cut in the seat or saddle carrier or rod A, engages easily with the lower teeth; but when the rack is forced down by the weight of the rider the upper teeth thrust hard against the rack-teeth and prevent further movement. In this manner the weight of the rider is firmly and efficiently supported.

When it is desired to detach the saddle, the rod A is pulled out in the direction of the arrow and the segment C at once slacks back and releases the rack B, permitting it to be pulled freely out of gear.

When it is desired to adjust the height of the saddle, the thumb-piece E' is depressed and the segment-piece held out of gear till the desired height is attained, when it is again slipped into gear, and so the height is fixed.

In existing bicycles or other velocipedes when a rod such as A', Fig. 2, is used to attach the saddle we cut a rack B' on the existing horizontal rod and we arrange a segment-rack C', pivoting at D' in a sliding piece F, and we pivot a rod or piece G at the same center D. This rod or piece G carries the saddle attached in any ordinary manner, as G', and when G is thrown back in the direction of the arrow, F may then be readily moved off A, and with it the saddle and the rod G. In order to adjust the height of the saddle a screw H is supplied, pressing against the tongue-piece Q, and a butting edge I allows within limits freedom of movement about the axle D' independently of the segment-piece C, and so the angle of G and therefore the height of the seat may be varied. The eccentricity of the segment-piece is so proportioned as to bring a fair but not excessive pressure to bear upon the teeth.

It will be noted that throughout the modification the pressure due to the weight of the rider holds the saddle or seat firmly in position, and immediately upon removal of this pressure the saddle may be at once removed or its height adjusted.

Having now particularly described and ascertained the nature of our said invention and in what manner the same is to be performed, we declare that what we claim is—

In combination with a rack-bar and a rider's seat supported thereby, an eccentric rack-segment in engagement with said bar and so arranged with relation thereto that the weight of the rider will firmly lock the seat in position, substantially as described.

In testimony whereof we have hereunto set our hands and affixed our seals in presence of two subscribing witnesses.

GEORGE HILTON SMITH. [L. S.]
RICHARD KENT HARTLEY. [L. S.]
ISAAC SHIMWELL McDOUGALL. [L. S.]

Witnesses:
ARTHUR C. HALL,
ARTHUR F. POPE,
9 Mount St., Manchester, England.